United States Patent Office 2,955,963
Patented Oct. 11, 1960

2,955,963
PROCESS FOR PURIFYING RAW SUGAR SOLUTIONS

Marco Itin, Trins/Grbd., Johann Giesen, Haldenstein near Chur, and Fritz Conradin, Tamins/Grbd., Switzerland, assignors to Inventa, A.G. für Forschung und Patentverwertung Luzern, Luzern, Switzerland No Drawing. Filed Oct. 16, 1958, Ser. No. 767,516

Claims priority, application Switzerland Oct. 28, 1957

8 Claims. (Cl. 127—37)

The present invention relates to a process for purifying raw sugar solutions.

It is known that sugar can be crystallized out from raw wood sugar solutions if the impurities are precipitated from the raw solutions with tannin, hypochlorite, metallic hydroxides, sodium chloride, ammonium sulphate, lead carbonate or aliphatic alcohols prior to crystallization. This precipitating can also be done by conducting direct current through the raw solutions by means of lead electrodes. (See Swiss Patent 274,509).

Furthermore, impurities can be precipitated from crude wood sugar solutions by means of ferric sulphate. (See Swiss Patent 280,059).

These processes have the disadvantage that the precipitating agent cannot be recovered or can be recovered only with much difficulty, since the impurities are united too firmly to the precipitating agent. Also, these known processes can be executed continuously only with difficulty.

One object of the present invention is to provide a new and improved process for purifying crude sugar solution which obviates the difficulties described above.

In accordance with the present invention, neutral raw sugar solutions are treated with solid insoluble metallic oxides and the metallic oxides laden with the impurities are separated from the sugar solutions.

In accordance with the more specific aspects of the invention, alpha-ferrous oxide is used as metallic oxide to particularly good advantage. This special iron oxide has already been previously proposed as adsorption agent from the chromatography of hydrocarbons, extracts from streptomycin cultures and polyoxyanthraquinones. Glemser and Rieck, Applied Chemistry 69 (1957) 91–97. Also the production of alpha ferric oxide is described there.

Somewhat less effective for the purpose of the present invention, but also sufficiently good is manganese dioxide.

The purification of the sugar solutions is conducted preferably in such a way that in the raw solution, the solid metallic oxide is suspended at temperatures of about 15–100° C. with stirring. After a few minutes, the solution is separated by filtering or pouring off the metallic oxide, which by now has adsorbed the impurities.

As an alternative process also effective, the raw sugar solution at a temperature of about 15–100° C. is run over a firmly arranged column of the metallic oxide to achieve purification. Temperatures of 50–100° C. are favorable. When use is made of more than one column, the process can be set up continuously in a simple manner.

From dark brown or black wood sugar worts, there is obtained in accordance with the process of the present invention, clear colorless or slightly yellowish sugar solutions, which can be worked up into colorless sorbite solutions in known manner, for example, by hydration. Also, by evaporation of the sugar solutions purified according to the present invention, sugars can be obtained in crystallized form. According to the present invention, both raw cane sugar and invert sugar, sugar produced by hydrolysis of material containing cellulose, such, for example, as wood—as well as other raw sugar solutions can be purified.

The regenerating of the alpha ferric oxide used for the adsorption is done in a simple manner by heating it to about 200–220° C. This range of temperature ought to be strictly observed so far as possible, since in this way, about 90–100% of the original adsorption capacity is restored.

The following examples illustrate certain ways in which the principle of the invention can be applied, but they are not to be construed as limiting the broader aspects of the invention.

Example 1

1 liter of clarified dark brown wood sugar wort neutralized with calcium carbonate (produced according to the Scholler process), with a sugar content of 4.1% and a light absorption of 100% (measured with Lange colorimeter, yellow filter), is stirred for a period of five minutes at 60° C. with 50 gr. of alpha ferric oxide. After the filtering, a light yellow solution is obtained with unaltered pH value and a light absorption of 10%. The sugar in this solution can be reduced to sorbite directly in known manner, as a result of which, a solution as clear as water is obtained, which does not subsequently darken upon evaporation. The iron oxide is dried and activated for a period of 3 hours in the drying cabinet at 200–220° C. and stands ready for further use with 95–100% capacity.

Example 2

1 liter of clarified black wood sugar wort neutralized with calcium carbonate (produced according to the Scholler process), with a sugar content of 4.0% and a light absorption of 100% (measured as in Example 1) is heated to 70° C. and is allowed to flow through a column that is charged with 50 gr. of alpha ferric oxide (Dia.=37 mm. H=100 mm.). At this point, the light absorption of the eluate drops to 8%. The iron oxide is brought within 12 hours close to the original capacity by a current of hot air of approximately 200° C. and is then ready for further use.

While the invention has been described with particular reference to specific embodiments, it is to be understood that it is not to be limited thereto, but is to be construed broadly and restricted solely by the scope of the appended claims.

What is claimed is:

1. The process of purifying a crude sugar solution obtained by a wood saccharification process, which comprises treating the solution with a solid insoluble metallic oxide, and separating the metallic oxide laden with the impurities from the sugar solution.

2. The process of purifying a crude sugar solution obtained by a wood saccharification process as described in claim 1, wherein the metallic oxide is alpha ferric oxide.

3. The process of purifying a crude sugar solution obtained by a wood saccharification process as described in claim 1, wherein the metallic oxide is manganese dioxide.

4. The process of purifying a crude sugar solution obtained by a wood saccharification process as described in claim 1, wherein the solution is treated with the metallic oxide at a temperature of 15°–100° C.

5. The process of purifying a crude sugar solution obtained by a wood saccharification process as described in claim 1, wherein the separated metallic oxide is regenerated by heating.

6. The process of purifying a crude sugar solution obtained by a wood saccharification process as described in claim 1, wherein the separated metallic oxide is regenerated by heating at a temperature of 200°–220° C.

7. The process of purifying a crude sugar solution obtained by a wood saccharification process as described in claim 2, wherein the separated alpha ferric oxide is regenerated by heating at a temperature of 200°–220° C.

8. The process of purifying a crude sugar solution produced by wood saccharification process, which comprises neutralizing the solution, treating the neutralized solution with a solid insoluble metallic oxide, and separating the metallic oxide laden with the impurities from the sugar solution.

References Cited in the file of this patent

UNITED STATES PATENTS

| | | |
|---|---|---|
| 2,504,169 | Wolfrom | Apr. 18, 1950 |
| 2,524,414 | Wolfrom | Oct. 3, 1950 |

OTHER REFERENCES

Chromatographic Adsorption Analysis, by Harold Strein, vol. II, 1942, Intersci. Pub., N.Y.C., p. 159.

Angewandte Chemie, vol. 69, Jan.–June 1957, pp. 91–93.